United States Patent
Kang et al.

(10) Patent No.: US 8,514,972 B2
(45) Date of Patent: Aug. 20, 2013

(54) APPARATUS AND METHOD FOR COMPENSATING FOR DELAY MISMATCH BETWEEN AMPLITUDE COMPONENT SIGNAL AND PHASE COMPONENT SIGNAL

(75) Inventors: Hun-Sik Kang, Daejeon (KR); Sok-Kyu Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 276 days.

(21) Appl. No.: 12/961,745

(22) Filed: Dec. 7, 2010

(65) Prior Publication Data

US 2011/0142177 A1 Jun. 16, 2011

(30) Foreign Application Priority Data

Dec. 15, 2009 (KR) .................. 10-2009-0125130
Jun. 10, 2010 (KR) .................. 10-2010-0055038

(51) Int. Cl.
 *H04L 25/49* (2006.01)
(52) U.S. Cl.
 USPC .................. 375/296; 375/285; 455/114.3
(58) Field of Classification Search
 USPC .................. 375/295–297; 455/114.3
 See application file for complete search history.

(56) References Cited

U.S. PATENT DOCUMENTS

| | | | |
|---|---|---|---|
| 7,254,195 B2* | 8/2007 | Servilio et al. ............... 375/345 |
| 7,359,680 B2 | 4/2008 | Klemmer | |
| 7,379,715 B2* | 5/2008 | Udagawa et al. ............ 455/126 |
| 7,453,927 B2 | 11/2008 | Vepsalainen et al. | |
| 2005/0100105 A1* | 5/2005 | Jensen ............... 375/259 |
| 2005/0220219 A1* | 10/2005 | Jensen ............... 375/302 |
| 2005/0245208 A1* | 11/2005 | Udagawa et al. ............ 455/102 |
| 2006/0057976 A1* | 3/2006 | Klemmer ............... 455/102 |
| 2006/0067427 A1* | 3/2006 | Zolfaghari et al. ............ 375/297 |
| 2006/0109052 A1* | 5/2006 | Saed et al. ............... 330/149 |
| 2006/0121858 A1* | 6/2006 | Tanaka et al. ............... 455/91 |
| 2006/0125560 A1* | 6/2006 | Saed ............... 330/149 |
| 2006/0158255 A1* | 7/2006 | Saed ............... 330/149 |
| 2006/0246856 A1* | 11/2006 | Udagawa et al. ............ 455/108 |
| 2007/0230612 A1* | 10/2007 | Ahmed ............... 375/295 |
| 2008/0026706 A1* | 1/2008 | Shimizu et al. ............... 455/108 |
| 2009/0202018 A1* | 8/2009 | Reddy et al. ............... 375/298 |
| 2009/0252255 A1* | 10/2009 | Lee et al. ............... 375/297 |
| 2009/0274244 A1* | 11/2009 | Jensen ............... 375/295 |

OTHER PUBLICATIONS

Chuande Zhi et al., "A New Adaptive Delay Method for Wideband Wireless Kahn's RF Power Amplifiers", IEEE Transactions on Consumer Electronics, Aug. 2006, pp. 962-965, vol. 52, No. 3, IEEE.

* cited by examiner

*Primary Examiner* — Shuwang Liu
*Assistant Examiner* — David Huang (57) ABSTRACT

Provided are an apparatus and method for compensating for a delay mismatch between an amplitude component signal and a phase component signal. The apparatus includes an amplitude path delay obtainer configured to obtain amplitude-delay information on a delay occurring in a propagation path of an amplitude component signal, a phase path delay obtainer configured to obtain phase-delay information on a delay occurring in a propagation path of a phase component signal, a delay controller configured to calculate and output a difference between the obtained amplitude path delay and the obtained phase path delay, and a variable delayer configured to compensate for a delay by changing a delay value on the basis of the delay difference output from the delay controller. Using an asynchronous method, in which a signal obtained before and after a delay is used as the clock signal of a memory device and the clock signal of a register to find the delay, it is possible to reduce the complexity of the constitution and increase power efficiency.

14 Claims, 10 Drawing Sheets

APPARATUS AND METHOD FOR COMPENSATING FOR DELAY MISMATCH BETWEEN AMPLITUDE COMPONENT SIGNAL AND PHASE COMPONENT SIGNAL

CROSS REFERENCE TO RELATED APPLICATION(S)

This application claims the benefit under 35 U.S.C. §119(a) of Korean Patent Application Nos. 10-2009-0125130, filed on Dec. 15, 2009, and 10-2010-0055038, filed on Jun. 10, 2010, in the Korean Intellectual Property Office, the entire disclosures of which are incorporated herein by references for all purposes.

BACKGROUND

1. Field

The following description relates to technology for compensating for a delay mismatch between an amplitude component and a phase component of a transmission signal in a polar transmitter, and more particularly, to an apparatus and method for compensating for a delay mismatch between an amplitude component signal and a phase component signal.

2. Description of the Related Art

Lately, use of a modulation method whereby much data is transmitted through a small bandwidth is increasing. A radio frequency (RF) transmission stage requires so high transmission signal power that digital signals are carried on carriers. To increase transmission signal power, it is advantageous to operate a power amplifier in a non-linear region. However, this method results in the distortion of a signal in terms of integrity.

When the power amplifier is operated in the non-linear region to prevent the distortion of a signal, the power efficiency of the transmission stage deteriorates, and the coverage of a system is reduced. To solve these problems, a polar transmitter which transmits a digital signal not using an in-phase component and a quadrature component but using an amplitude component and a phase component is used.

SUMMARY

In one general aspect, there is provided an apparatus for compensating for a delay mismatch between an amplitude component signal and a phase component signal, including: an amplitude path delay obtainer configured to obtain amplitude-delay information on a delay occurring in a propagation path of an amplitude component signal; a phase path delay obtainer configured to obtain phase-delay information on a delay occurring in a propagation path of a phase component signal; a delay controller configured to calculate and output a difference between the obtained amplitude path delay and the obtained phase path delay; and a variable delayer configured to compensate for a delay by changing a delay value on the basis of the delay difference output from the delay controller.

In another general aspect, there is provided a method of compensating for a delay mismatch between an amplitude component signal and a phase component signal, including: obtaining amplitude-delay information on a delay occurring in a propagation path of an amplitude component signal; obtaining phase-delay information on a delay occurring in a propagation path of a phase component signal; calculating a difference between the obtained amplitude path delay and the obtained phase path delay; and compensating for a delay on the basis of the calculated delay difference.

Other features will become apparent to those skilled in the art from the following detailed description, which, taken in conjunction with the attached drawings, discloses exemplary embodiments of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 1:
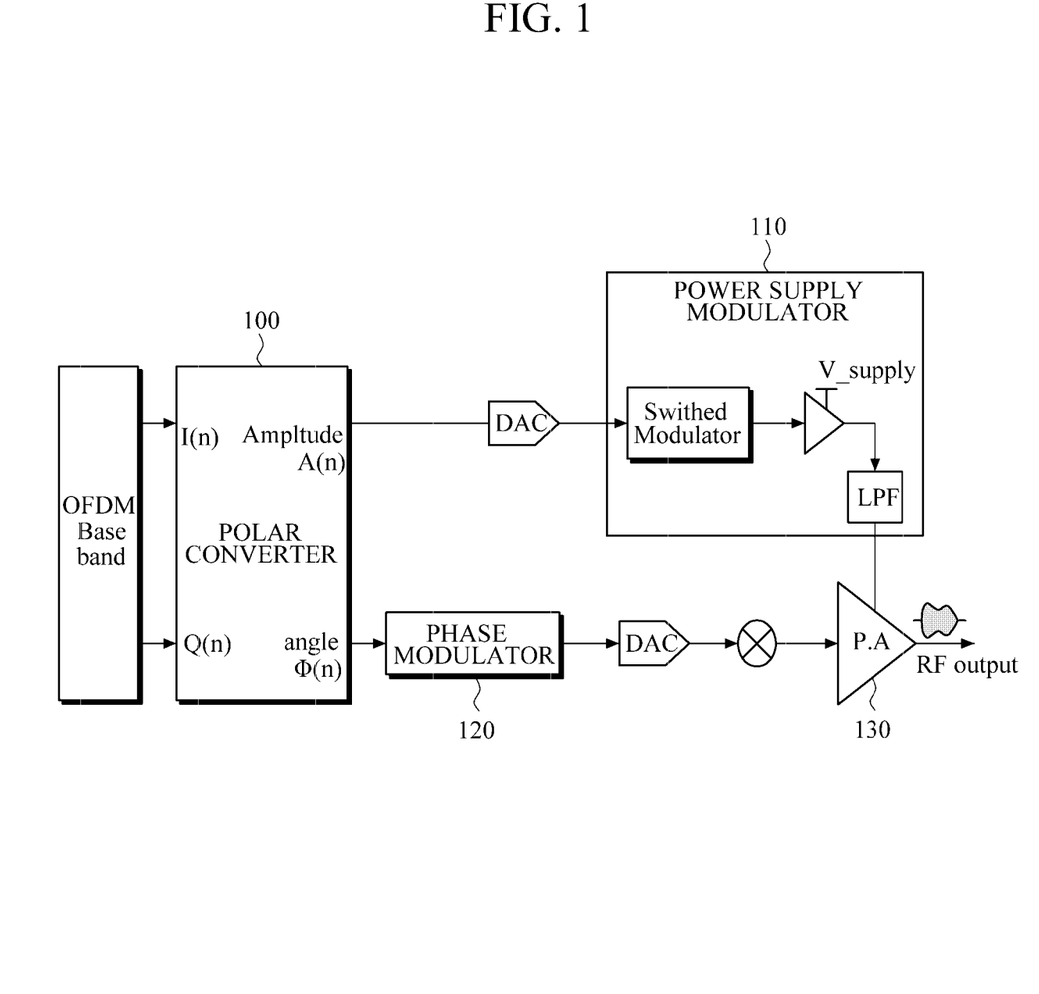
FIG. 1 is a block diagram of a general polar transmitter.

FIG. 1 is a block diagram of a general polar transmitter.

As shown in FIG. 1, a polar converter 100 converts an in-phase component and a quadrature component of an orthogonal frequency division multiplexing (OFDM) baseband signal input from a digital modulation stage into an amplitude component and a phase component.

The conversion can be expressed by Equation 1 below.

$$A(n) = \sqrt{I(n)^2 + Q(n)^2}, \; \phi(n) = \tan^{-1}\left(\frac{Q(n)}{I(n)}\right) \quad \text{[Equation 1]}$$

As can be seen from FIG. 1, an amplitude component A(n) is input to a power supply modulator 110 which modulates the power supply of a power amplifier 130 at a transmission stage. A phase component φ(n) is carried on a carrier frequency by a phase modulator 120 and input to the power amplifier 130.

In the polar structure shown in FIG. 1, a phase component φ(n) signal is input to the power amplifier 130 as a signal having a uniform amplitude. The power supply of the power amplifier 130 is modulated by the amplitude component A(n).

Since the power amplifier 130 operates in a linear region regardless of the amplitude size, it is possible to increase power efficiency. However, a path through which an amplitude component passes is substantially different from a path through which a phase component passes, and it is impossible to make delays of blocks or devices present on the paths identical to each other. Thus, the delay of the amplitude component does not coincide with that of the phase component.

Such a disagreement or mismatch between the delay of an amplitude component and the delay of a phase component (hereinafter referred to as a delay mismatch) has influence on an adjacent channel in the frequency spectrum of a transmission signal, and thus an adjacent channel power ratio (ACPR) increases. As a result, an increase in a delay mismatch deteriorates network performance.

Figure 2:
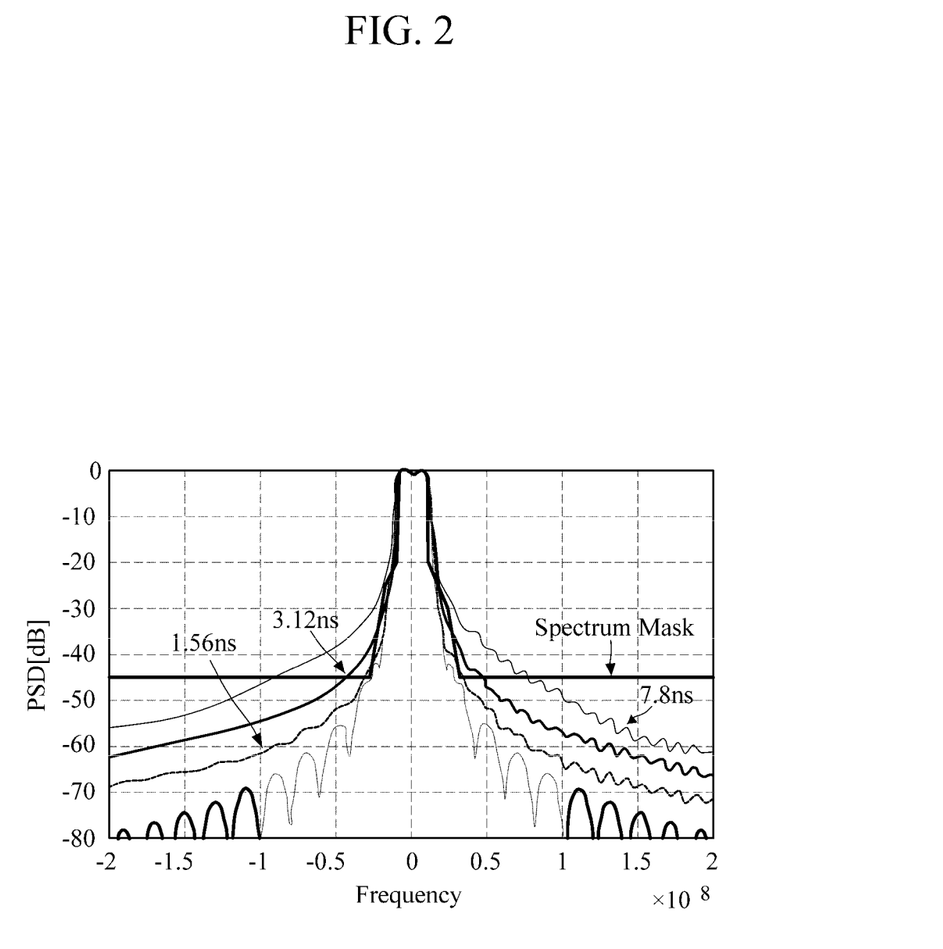
FIG. 2 is a graph showing influence of a frequency spectrum in a wireless local area network (LAN) employing an orthogonal frequency division multiplexing (OFDM) signal.

FIG. 2 is a graph showing influence of a frequency spectrum in a wireless local area network (LAN) employing an OFDM signal.

As shown in FIG. 2, the greater a delay mismatch, the more the graph departs from a spectrum mask. In other words, as a delay mismatch increases, influence on an adjacent channel increases.

In a conventional method, to reduce the influence of a delay mismatch, the square of a delay difference between an amplitude and a phase is adjusted to be the minimum using a least mean square (LMS) signal processing algorithm. This method requires repeated arithmetic operations, thus involving many signal processing tasks and high complexity.

In another conventional method, a phase detector and an envelope detector are combined to control a delay mismatch.

Figure 3:
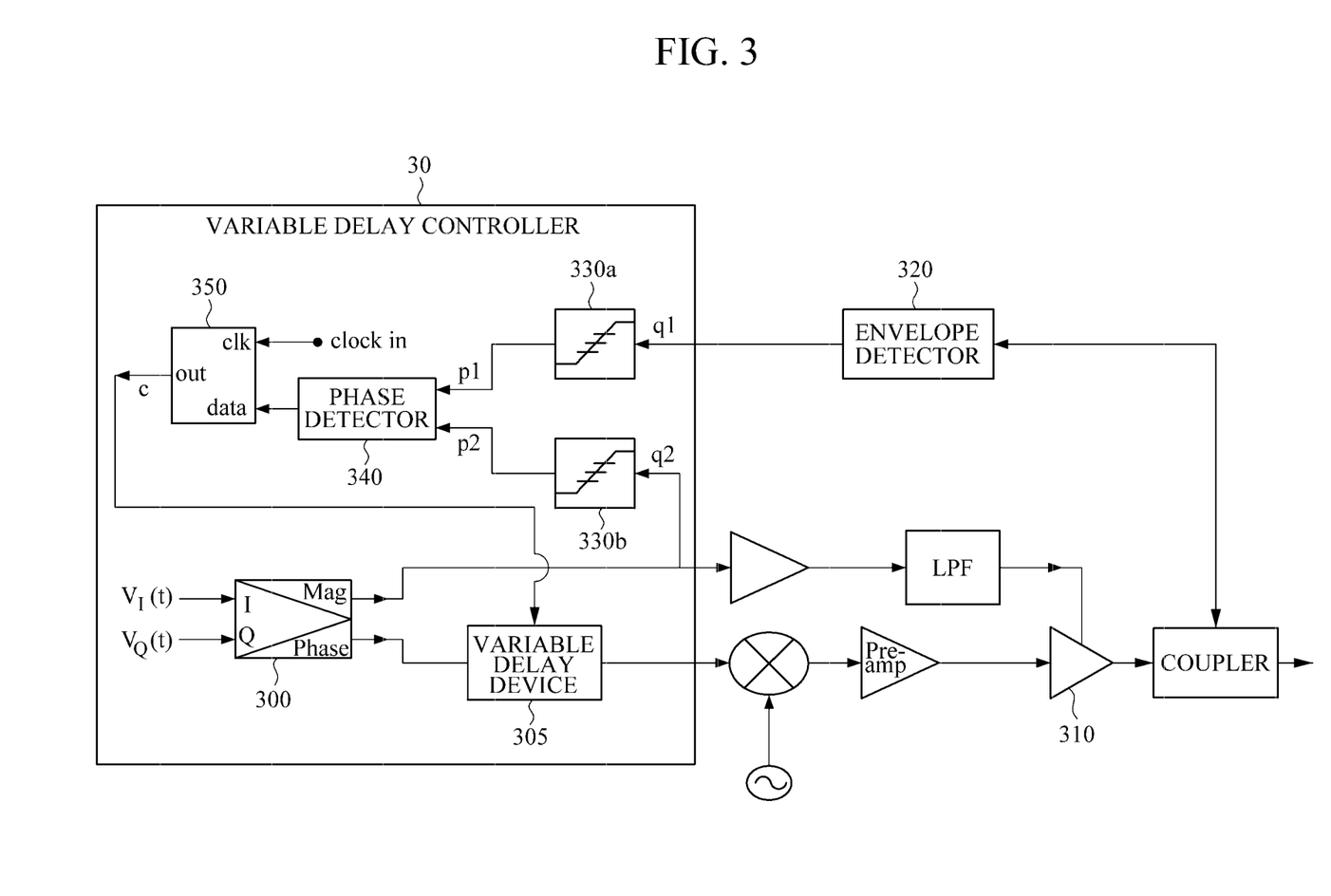
FIG. 3 is a block diagram illustrating delay mismatch control technology.

FIG. 3 is a block diagram illustrating delay mismatch control technology.

FIG. 3 illustrates technology for controlling a delay mismatch using a combination of a phase detector and an envelope detector. To remove a delay mismatch, an envelope detector 320 extracts an amplitude component q1 by removing a carrier from the output of a power amplifier 310. The amplitude component q1 is converted into a digital signal p1 by a quantizer 330a in a variable delay controller 30.

A phase detector 340 detects and compares the phases of the converted signal p1 and a signal p2 obtained by quantizing, at a quantizer 330b, an output signal q2. The output signal q2 is an output signal of a polar converter 300 which converts rectangular components $V_I(t)$ and $V_Q(t)$ into polar components.

The phase detector 340 generates a pulse signal having a width equal to the delay of the two signals p1 and p2. A counter and register 350 calculates the width of the generated pulse signal. A variable delay register 305 obtains the value of the delay mismatch using the width of the pulse signal calculated by the counter and register 350, and adjusts the delay of a phase component signal.

At this time, the delay should be adjusted in units of several nanoseconds or less. Here, since a synchronous counter is used, a high clock frequency is required. Also, output signals of the phase detector 340 are generated without synchronization with the synchronous counter, and thus the synchronous counter may enter a meta-stability state.

Exemplary embodiments of the present invention are suggested to solve these problems that the conventional constitution for controlling delay compensation is complex and requires a high clock frequency, and a synchronous counter may be placed in the meta-stability state.

Figure 4:
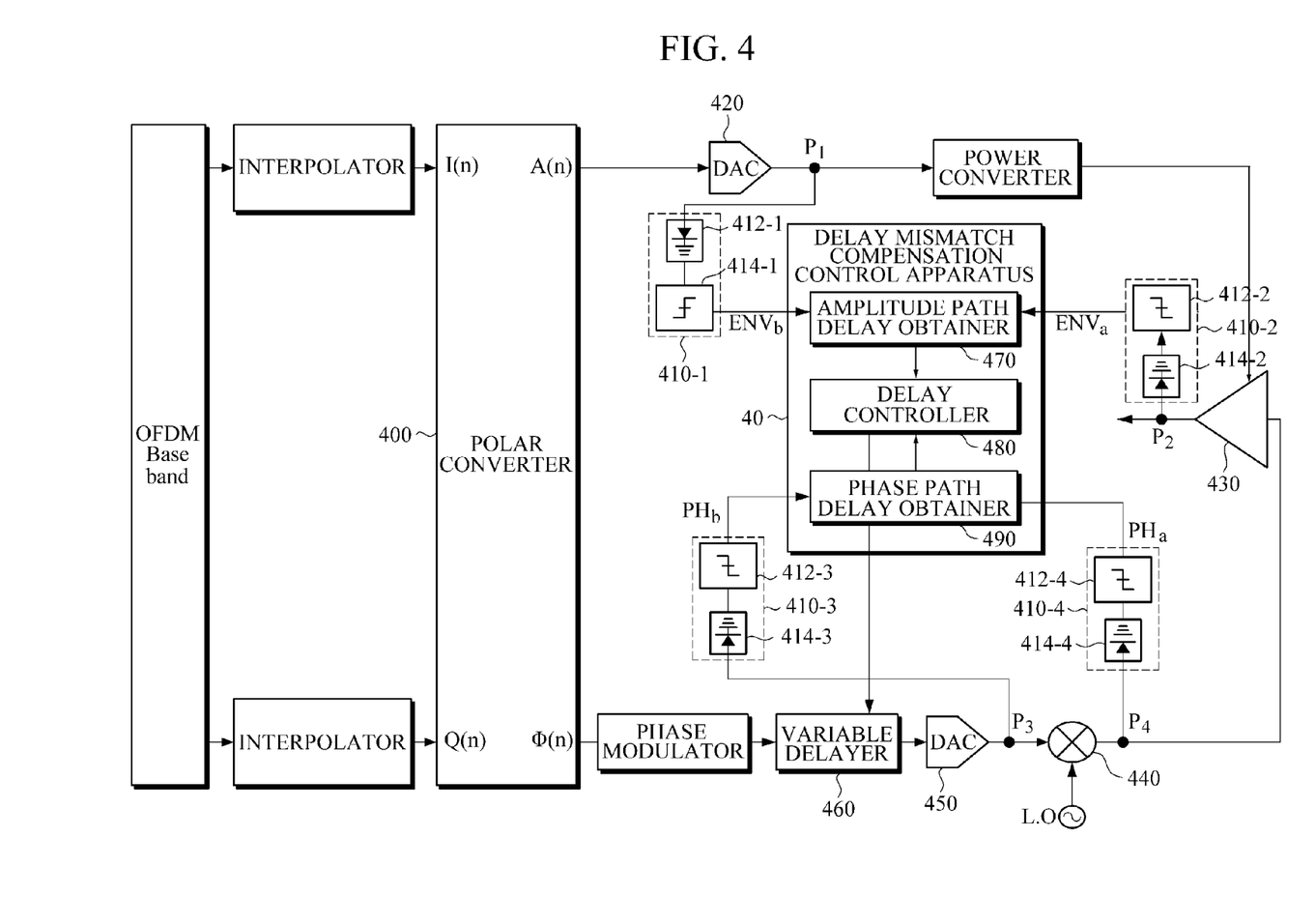
FIG. 4 is a block diagram of a delay compensation apparatus according to an exemplary embodiment of the present invention.

FIG. 4 is a block diagram of a delay compensation apparatus according to an exemplary embodiment of the present invention. The delay compensation apparatus shown in FIG. 4 has been implemented in a polar transmitter in an OFDM-based wireless LAN, but may be implemented in a device other than the polar transmitter.

As shown in the drawing, the delay compensation apparatus according to an exemplary embodiment of the present invention includes a polar converter 400 which receives an OFDM baseband signal and converts an in-phase and quadrature phase (I/Q) signal into amplitude and phase component signals, signal detectors 410-1, 410-2, 410-3 and 410-4 which detect signals at a delay start point and a delay end point in each signal path to find the delays of phase path and amplitude path signals output from the polar converter 400, a delay mismatch compensation control apparatus 40, and a variable delayer 460.

More specifically, the signal detectors 410-1 to 410-4 include the first signal detector 410-1 which detects a signal at an output terminal P1 of a digital to analog converter (DAC) 420 in an amplitude path, the second signal detector 410-2 which detects an output signal at an output terminal P2 of a power amplifier 430 in the amplitude path, the third signal detector 410-3 which detects an output signal at an output terminal P3 of a DAC 450 in a phase path, and the fourth signal detector 410-4 which detects an output signal at an output terminal P4 of a mixer 440 in the phase path.

Here, each of the first to fourth signal detectors 410-1 to 410-4 includes a peak detector 412-1, 412-2, 412-3 or 412-4 which detects a peak signal, and a comparator 414-1, 414-2, 414-3 or 414-4 which converts the signal detected by the peak detector 412-1, 412-2, 412-3 or 412-4 into a digital signal.

The digital signals of the respective signal detectors 410-1, 410-2, 410-3 and 410-4 are transferred to the delay mismatch compensation control apparatus 40.

The delay mismatch compensation control apparatus 40 includes an amplitude path delay obtainer 470, a phase path delay obtainer 490, and a delay controller 480. The amplitude path delay obtainer 470 estimates the delay of the amplitude signal path using signals $ENV_b$ and $ENV_a$ output from the first signal detector 410-1 and the second signal detector 410-2. The phase path delay obtainer 490 estimates the delay of the phase component signal path using signals $PH_b$ and $PH_a$ output from the third signal detector 410-3 and the fourth signal detector 410-4. The delay controller 480 calculates a delay mismatch value using the delay of the amplitude component signal path estimated by the amplitude path delay obtainer 470 and the delay of the phase component signal path estimated by the phase path delay obtainer 490, and transfers the calculation result to the variable delayer 460.

The variable delayer 460 changes a delay value on the basis of the delay mismatch value received from the delay mismatch compensation control apparatus 40.

Figure 5:
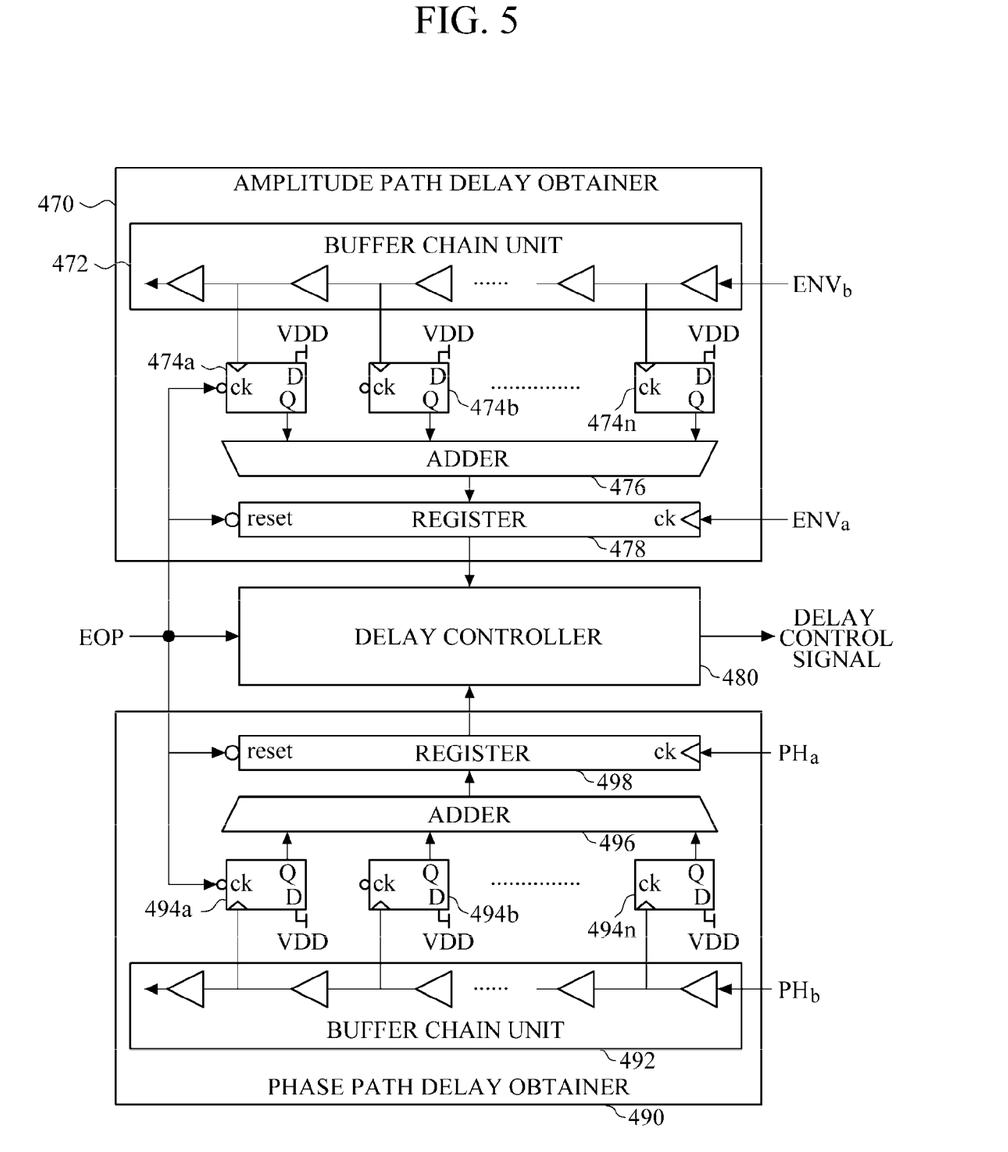
FIG. 5 is a detailed block diagram of a delay mismatch compensation control apparatus according to an exemplary embodiment of the present invention.

FIG. 5 is a detailed block diagram of a delay mismatch compensation control apparatus according to an exemplary embodiment of the present invention.

As shown in FIGS. 4 and 5, in an exemplary embodiment, the amplitude path delay obtainer 470 of the delay mismatch compensation control apparatus 40 includes a buffer chain unit 472, memory devices 474a to 474n, an adder 476, and a register 478 to obtain an amplitude path delay.

The buffer chain unit 472 includes a chain of buffers connected in series to obtain an amplitude path delay.

The memory devices 474a to 474n receive output values of the respective buffers included in the buffer chain unit 472 as clock signals ck. In other words, the amplitude envelope signal $ENV_b$ input at a point in time when the delay of the amplitude path begins passes through the buffer chain unit 472, and the output signals of the respective buffers are input to the memory devices 474a to 474n as the clock signals ck, respectively. Here, the memory devices 474a to 474n may be flip-flops. When the memory devices are, for example, D flip-flops, high values are input to the D input terminals. This is intended to reproduce the input signals as signals divided by a resolution equal to the propagation delay of the respective buffers constituting the buffer chain.

The adder 476 adds the output values of the memory devices 474a to 474n. The adder 476 performs the addition operation from a point in time corresponding to the point P2 where the delay of the amplitude path ends until the amplitude envelope signal $ENV_a$ is switched from low to high positive edge. When the amplitude envelope signal $ENV_a$ is switched from low to high, the amplitude envelope signal $ENV_a$ is input to a clock signal ck of the register 478 which latches an output of the adder 476.

The register 478 stores a delay value of each amplitude path in the form of integer times a propagation delay value of each buffer. Thus, it is possible to estimate the delay value of each amplitude path.

In an exemplary embodiment of the present invention, the phase path delay obtainer 490 of the delay mismatch compensation control apparatus 40 includes a buffer chain unit 492, memory devices 494a to 494n, an adder 496, and a register 498 to obtain a phase path delay.

The buffer chain unit 492 includes a chain of buffers connected in series to obtain a phase path delay.

The memory devices 494a to 494n receive output values of the respective buffers included in the buffer chain unit 492 as clock signals ck. In other words, the phase envelope signal $PH_b$ is generated at a point in time when the delay of the phase path begins. The generated phase envelope signal $PH_b$ is input to the buffer chain unit 492. The output signals of the respective buffers included in the buffer chain unit 492 are input to the memory devices 494a to 494n as the clock signals ck, respectively. Here, the memory devices 494a to 494n may be flip-flops. When the memory devices are, for example, D flip-flops, high values are input to the D input terminals. This is intended to reproduce the input signals as signals divided by a resolution equal to the propagation delay of the respective buffers constituting the buffer chain.

The adder 496 adds output values of the memory devices 494a to 494n. The adder 496 performs the addition operation from a point in time corresponding to the point P4 where the delay of the phase path ends until the phase envelope signal $PH_a$ is switched from low to high positive edge. When the phase envelope signal $PH_a$ is switched from low to high, the phase envelope signal $PH_a$ is input to the register 498 which latches an output of the adder 496.

The register 498 stores a delay value of each phase path in the form of integer times a propagation delay value of each buffer. Thus, it is possible to estimate the delay value of each phase path.

The delay controller 480 calculates a delay difference between the two paths using the delay values estimated by the amplitude path delay obtainer 470 and the phase path delay obtainer 490. Then, the delay controller 480 transfers the calculated delay difference to a variable delay device to adjust a delay value.

In packet communications, every packet may have a difference in delay value between an amplitude path and a phase path. Thus, the memory devices and the registers of the phase path delay obtainer 490 and the amplitude path delay obtainer 470 should initialize stored values per packet. Every time a new packet is input, the delay controller 480 initializes the memory devices 474a to 474n and the register 478 of the amplitude path delay obtainer 470 and the memory devices 494a to 494n and the register 498 of the phase path delay obtainer 490.

At this time, a digital modulation stage generates a signal indicating the start and end of the packet, that is, a start-of-packet (SOP) signal and an end-of-packet (EOP) signal. The delay controller 480 can determine whether or not input of a new packet is started on the basis of the input from the digital modulation stage.

Figure 6:
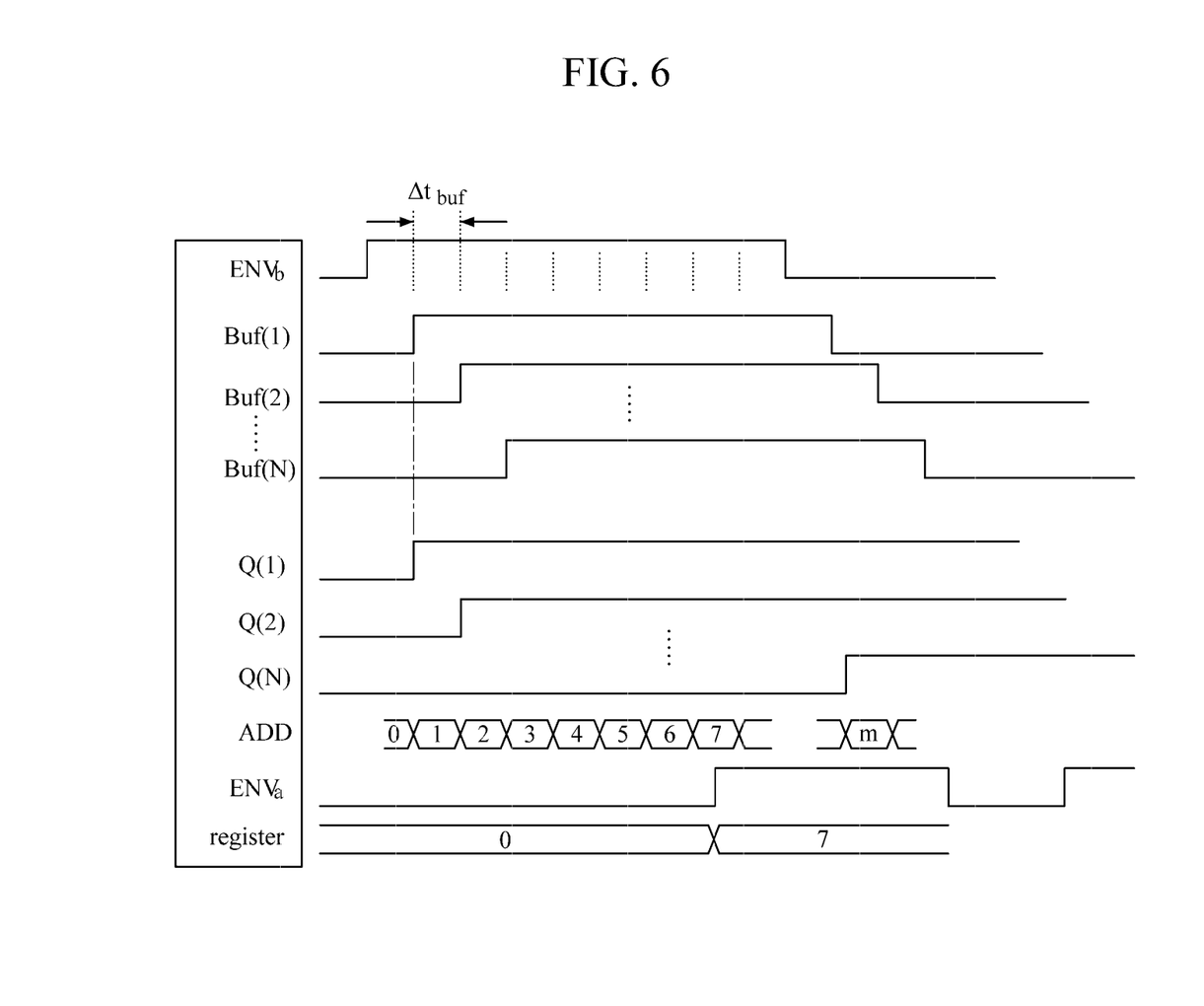
FIG. 6 is a timing diagram illustrating a process of estimating the delay of an amplitude path according to an exemplary embodiment of the present invention.

FIG. 6 is a timing diagram illustrating a process of estimating the delay of an amplitude path according to an exemplary embodiment of the present invention.

It is assumed in FIG. 6 that a buffer chain unit includes N buffers, and each of the buffers to has a signal delayed for $\Delta t_{buf}$.

When the amplitude envelope signal $ENV_b$ is input, each of the buffers buf(1), buf(2), ..., and buf(N) delays the amplitude envelope signal $ENV_b$ for a time increasing by $\Delta t_{buf}$ and outputs the delayed amplitude envelope signal $ENV_b$.

The outputs of the respective buffers are connected to the clock input terminals of memory devices, and outputs of the memory devices are set to high when the outputs of the buffers are switched from low to high.

An adder continuously adds the outputs of the memory devices until the amplitude envelope signal $ENV_a$ is input. When the amplitude envelope signal $ENV_a$ is switched from low to high, the register stores the accumulated value output from the adder. This is a delay value of the amplitude path.

For example, when the propagation delay value $\Delta t_{buf}$ of the buffers is 1 ns and an output value of the adder stored in the register is 7, a delay value of the amplitude path is calculated by multiplying the accumulated value stored in the register and the propagation delay value $\Delta t_{buf}$, that is, 7×1=7 (ns). The delay of the amplitude path can be estimated by applying the phase envelope signals $PH_b$ and $PH_a$ instead of the amplitude envelope signals $ENV_b$ and $ENV_a$ to the above-described process of estimating the delay of an amplitude path.

A difference in delay value between the amplitude path and the phase path can be calculated by the following equation:

$$\hat{\Delta} = \tau_e - \tau_\phi = (\Delta t_{buf}) \cdot \left( \sum_{i=1}^{N_e} Q_i - \sum_{j=1}^{N_\phi} Q_j \right) \quad \text{[Equation 2]}$$

$$\text{where } N_e = \text{floor}\left( \frac{T_{e,a} - T_{e,b}}{\Delta t_{buf}} \right) \text{ and}$$

$$N_\phi = \text{floor}\left( \frac{T_{\phi,a} - T_{\phi,b}}{\Delta t_{buf}} \right)$$

$\tau_e$ and $\tau_\phi$ denote the delay values of the amplitude path and the phase path respectively, and $Q_i$ and $Q_j$ denote outputs of memory devices in the amplitude path and the phase path respectively. $T_{e,b}$ denotes a time corresponding to the start point in the amplitude path, that is, to $P_1$, and $T_{e,a}$ denotes a time corresponding to the end point in the amplitude path, that is, $P_2$. $T_{\phi,b}$ denotes a time corresponding to the start point in the phase path, that is, $P_3$, and $T_{\phi,a}$ denotes a time corresponding to the end point in the phase path, that is, $P_4$.

Figure 7:
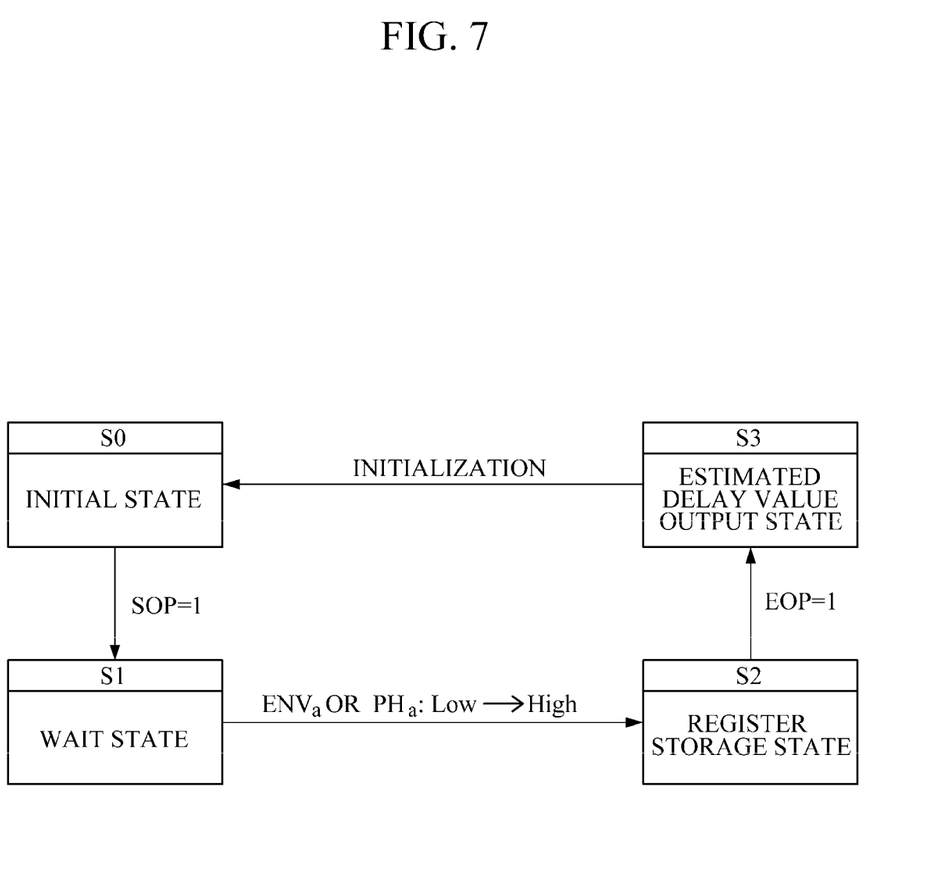
FIG. 7 illustrates operating states of a delay controller according to an exemplary embodiment of the present invention.

FIG. 7 illustrates operating states of a delay controller according to an exemplary embodiment of the present invention.

As shown in FIG. 7, when an SOP signal becomes "1," a delay controller in an initial state S0 is switched to a wait state S1. When the amplitude envelope signal $ENV_a$ or the phase envelope signal $PH_a$ becomes "high," the delay controller switches to a register storage state S2. At this time, estimated delay values are stored in registers in an amplitude path delay estimator and a phase path delay estimator. When an EOP signal becomes "1," the delay controller switches to an estimated delay value output state S3 to transfer the estimated delay values to an external variable delay device. The delay controller resets the estimated values stored in the memory devices and registers and switches back to the initial state S0.

Figure 8:
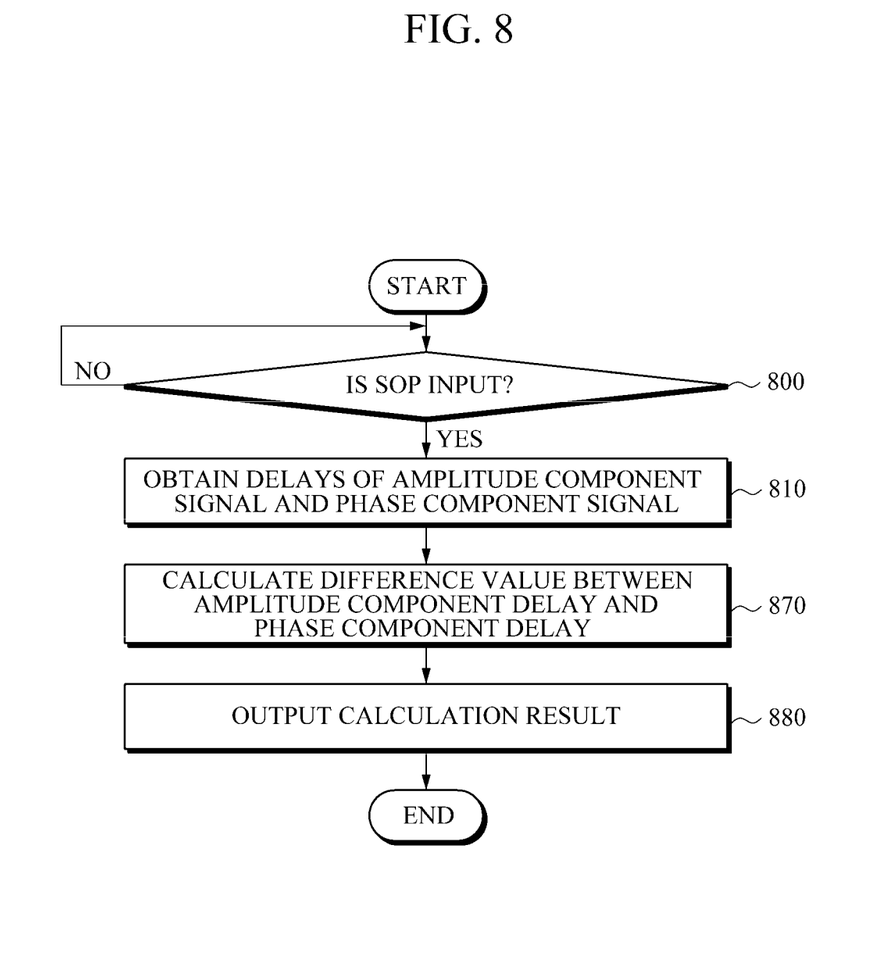
FIGS. 8 to 10 are flowcharts illustrating a method of compensating for a delay mismatch between an amplitude component and a phase component of a transmission signal according to an exemplary embodiment of the present invention.
Figure 9:
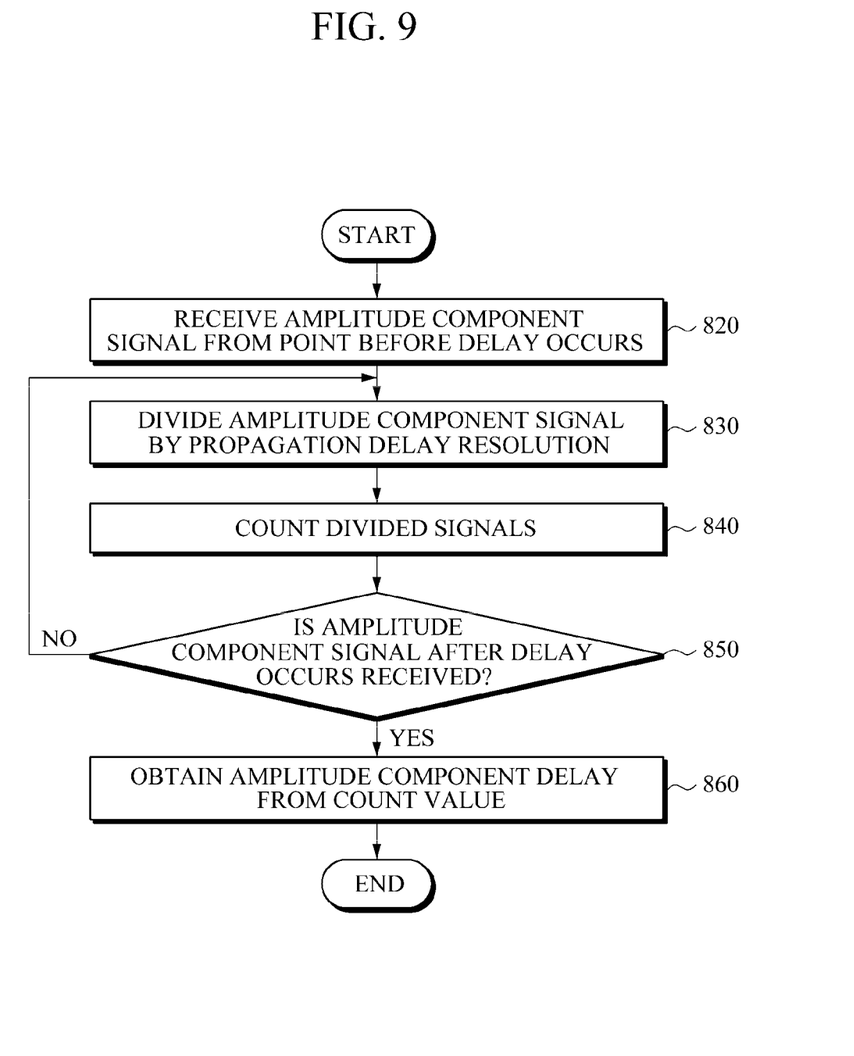
Figure 10:
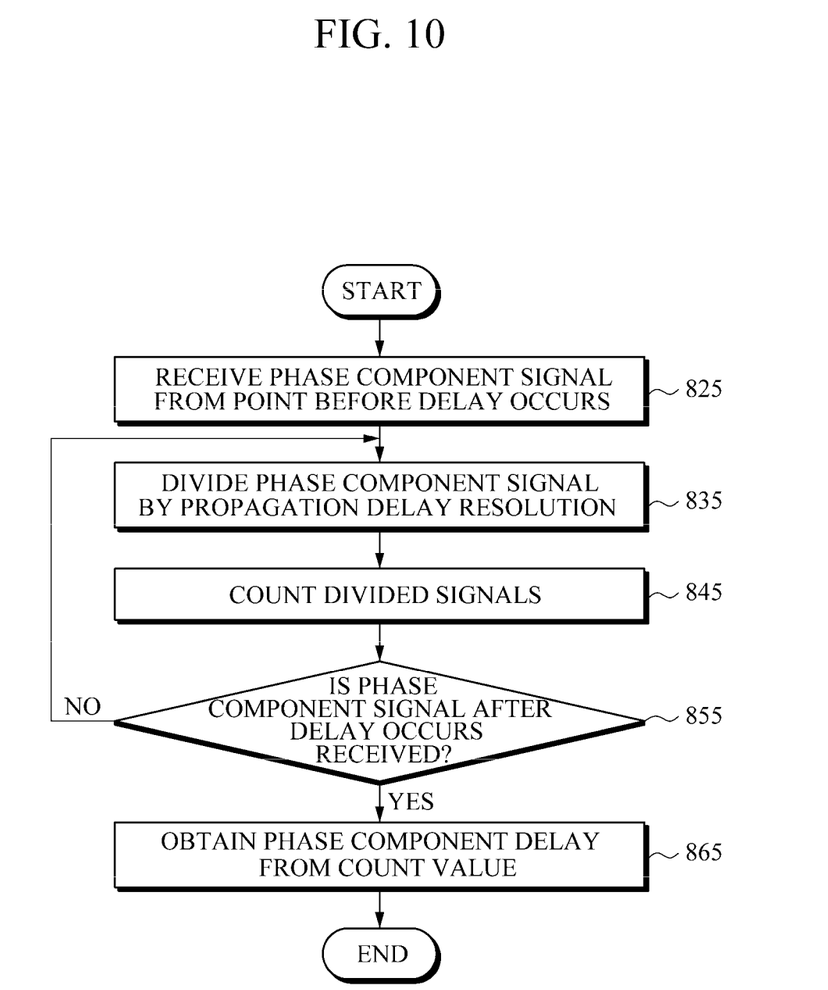

FIGS. 8 to 10 are flowcharts illustrating a method of compensating for a delay mismatch between an amplitude component and a phase component of a transmission signal according to an exemplary embodiment of the present invention.

As shown in FIG. 8, when an SOP signal becomes "1" (operation 800), a delay controller switches to the wait state S1.

Then, a delay occurring in a propagation path of an amplitude component signal and a delay occurring in a propagation path of a phase component signal are obtained (operation 810).

After this, a difference between the value of the obtained delay occurring in the propagation path of the amplitude component signal and the value of the obtained delay occurring in the propagation path of the phase component signal is calculated (operation 870), and the calculation result is provided to a variable delayer to adjust a delay value (operation 880).

FIG. 9 is a detailed flowchart illustrating a process of obtaining an amplitude component delay, and FIG. 10 is a detailed flowchart illustrating a process of obtaining a phase component delay.

As shown in FIG. 9, to obtain an amplitude component delay, an amplitude component signal is input from a point before delay occurs (operation 820). The amplitude component signal input from the point before delay occurs is divided by a propagation delay resolution (operation 830). At this time, the division operation is performed by a buffer chain including a plurality of buffers.

Then, the divided signal inputs are counted (operation 840). The count operation may be performed by summing output values of memory devices which receive outputs of the buffers included in the buffer chain as their clocks. Here, the memory devices may be flip-flops.

When the amplitude component signal is input from a point after the delay occurs while the summing operation is continuously performed (operation 850), the corresponding count value is obtained as the value of the delay occurring in the propagation path of the amplitude component signal (operation 860).

As shown in FIG. 10, to obtain a delay occurring in the propagation path of a phase component signal, the phase component signal is input from a point before the delay occurs (operation 825). The phase component signal input from the point before the delay occurs is divided by a propagation delay resolution (operation 835). At this time, the division operation is performed by a buffer chain including a plurality of buffers.

Then, the divided signal inputs are counted (operation 845). The count operation may be performed by summing output values of memory devices which receive outputs of the buffers included in the buffer chain as their clocks. Here, the memory devices may be flip-flops.

When the phase component signal is input from a point after the delay occurs while the summing operation is continuously performed (operation 855), the corresponding count value is obtained as the value of the delay occurring in the propagation path of the phase component signal (operation 865).

Additionally, when input of a new packet is detected, the count values are initialized.

The above-described method of compensating for a delay mismatch of a transmission signal can be embodied as a computer program. The program can be stored in computer-readable media, and read and executed by a computer system, thereby implementing the method. The computer-readable recording media include magnetic recording media, optical recording media, etc.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for compensating for a delay mismatch between an amplitude component signal and a phase component signal, comprising:
   an amplitude path delay obtainer configured to obtain amplitude-delay information on a delay occurring in a propagation path of an amplitude component signal;
   a phase path delay obtainer configured to obtain phase-delay information on a delay occurring in a propagation path of a phase component signal;
   a delay controller configured to calculate and output a difference between the obtained amplitude path delay and the obtained phase path delay;
   a variable delayer configured to compensate for a delay by changing a delay value on the basis of the delay difference output from the delay controller;
   a first signal detector configured to detect the amplitude component signal in the amplitude component signal propagation path before the delay occurs; and
   a second signal detector configured to detect the amplitude component signal in the amplitude component signal propagation path after the delay occurs,
   wherein the amplitude path delay obtainer obtains the amplitude-delay information on the delay on the basis of the detection results of the first signal detector and the second signal detector.

2. The apparatus of claim 1, wherein the amplitude path delay obtainer comprises:
   a buffer chain unit including a plurality of buffers for reproducing the amplitude component signal generated from a point in the amplitude component signal propagation path before the delay occurs as signals divided by a resolution of the same length as a propagation delay;
   a plurality of memory devices configured to receive outputs of the respective buffers of the buffer chain unit as clocks;
   an adder configured to sum output values of the memory devices; and
   a register configured to receive the sum result from the adder, store the sum result, and provide the stored sum result to the delay controller when the amplitude component signal is input as a clock signal from a point in the amplitude component signal propagation path after the delay occurs.

3. The apparatus of claim 2, wherein when input of a new amplitude component signal packet is detected, the delay controller resets the memory devices and the register.

4. The apparatus of claim 2, wherein the memory devices are flip-flops.

5. The apparatus of claim 1, wherein the phase path delay obtainer comprises:
a buffer chain unit comprising a plurality of buffers for reproducing the phase component signal generated from a point in the phase component signal propagation path before the delay occurs as signals divided by a resolution of the same length as a propagation delay;
a plurality of memory devices configured to receive outputs of the respective buffers of the buffer chain unit as clocks;
an adder configured to sum output values of the memory devices; and
a register configured to receive the sum result from the adder, store the sum result, and provide the stored sum result to the delay controller when the phase component signal is input as a clock signal from a point in the phase component signal propagation path after the delay occurs.

6. The apparatus of claim 5, wherein when input of a new phase component signal packet is detected, the delay controller resets the memory devices and the register.

7. The apparatus of claim 1, wherein to detect an envelope of the amplitude component signal, each of the first signal detector and the second signal detector comprises:
a peak detector configured to detect a peak signal; and
a comparator configured to convert the signal detected by the peak detector into a digital signal.

8. The apparatus of claim 1, further comprising:
a third signal detector configured to detect the phase component signal in the phase component signal propagation path before the delay occurs; and
a fourth signal detector configured to detect the phase component signal in the phase component signal propagation path after the delay occurs,
wherein the phase path delay obtainer obtains the phase-delay information on the delay on the basis of the detection results of the third signal detector and the fourth signal detector.

9. The apparatus of claim 8, wherein to detect an envelope of the phase component signal, each of the third signal detector and the fourth signal detector comprises:
a peak detector configured to detect a peak signal; and
a comparator configured to convert the signal detected by the peak detector into a digital signal.

10. A method of compensating for a delay mismatch between an amplitude component signal and a phase component signal, comprising:
obtaining amplitude-delay information on a delay occurring in a propagation path of an amplitude component signal;
obtaining phase-delay information on a delay occurring in a propagation path of a phase component signal;
calculating a difference between the obtained amplitude path delay and the obtained phase path delay; and
compensating for a delay on the basis of the calculated delay difference,
wherein the obtaining of the information on the amplitude path delay comprises:
dividing the amplitude component signal input from a point in the amplitude component signal propagation path before the delay occurs by a resolution of the same length as a propagation delay;
counting the divided signals; and
obtaining the count result as the amplitude path delay when the amplitude component signal input from a point in the amplitude component signal propagation path after the delay occurs is detected.

11. The method of claim 10, further comprising resetting the count result when input of a new amplitude component signal packet is detected.

12. The method of claim 10, wherein the obtaining of the phase-delay information on the phase path delay comprises:
dividing the phase component signal input from a point in the phase component signal propagation path before the delay occurs by a resolution of the same length as a propagation delay;
counting the divided signals; and
obtaining the count result as the phase path delay when the phase component signal input from a point in the phase component signal propagation path after the delay occurs is detected.

13. The method of claim 12, further comprising resetting the count result when input of a new phase component signal packet is detected.

14. An apparatus for compensating for a delay mismatch between an amplitude component signal and a phase component signal, comprising:
an amplitude path delay obtainer configured to obtain amplitude-delay information on a delay occurring in a propagation path of an amplitude component signal;
a phase path delay obtainer configured to obtain phase-delay information on a delay occurring in a propagation path of a phase component signal;
a delay controller configured to calculate and output a difference between the obtained amplitude path delay and the obtained phase path delay;
a variable delayer configured to compensate for a delay by changing a delay value on the basis of the delay difference output from the delay controller;
a third signal detector configured to detect the phase component signal in the phase component signal propagation path before the delay occurs; and
a fourth signal detector configured to detect the phase component signal in the phase component signal propagation path after the delay occurs,
wherein the phase path delay obtainer obtains the phase-delay information on the delay on the basis of the detection results of the third signal detector and the fourth signal detector.

* * * * *